United States Patent [19]

Grossi et al.

[11] Patent Number: 4,547,225

[45] Date of Patent: Oct. 15, 1985

[54] ADDITIVES FOR HOT MIX ASPHALT

[75] Inventors: Anthony V. Grossi; Louis T. Hahn; Alfred Marzocchi, all of Newark, Ohio

[73] Assignee: Owens-Corning Fiberglas Corporation, Toledo, Ohio

[21] Appl. No.: 607,858

[22] Filed: May 7, 1984

[51] Int. Cl.$^4$ .................. C08L 95/00; C09D 3/24
[52] U.S. Cl. .................. 106/273 N; 524/59; 524/71; 525/54.5; 208/44
[58] Field of Search .......... 106/273 N; 524/71, 59; 525/54.5; 208/44

[56] References Cited

U.S. PATENT DOCUMENTS

| | | | |
|---|---|---|---|
| 4,383,081 | 5/1983 | Grossi et al. | 525/54.5 |
| 4,394,481 | 7/1983 | Grossi et al. | 525/54.5 |
| 4,419,489 | 12/1983 | Grossi et al. | 525/54.5 |
| 4,436,767 | 3/1984 | Grossi et al. | 427/138 |
| 4,436,864 | 3/1984 | Grossi et al. | 524/458 |

Primary Examiner—A. Lionel Clingman
Attorney, Agent, or Firm—Ronald C. Hudgens; Robert F. Rywalski; Debra L. Pawl

[57] ABSTRACT

The adherence between an asphalt and aggregate is improved by including in the combination styrene and an acrylamide.

8 Claims, No Drawings

ADDITIVES FOR HOT MIX ASPHALT

TECHNICAL FIELD

This invention pertains to chemically-modified asphalts.

In one of its more specific aspects, this invention pertains to chemically-modified asphalts as additives for hot mix asphalts.

BACKGROUND OF THE INVENTION

The use of hot mix asphalts is well known. Frequently, such asphalts comprise an asphaltic mixture in combination with suitable aggregate, the combination being employed for the laying of asphalt surfaces. Such surfaces are frequently laid at elevated temperatures and the combination is cooled to form a durable surface, the combination being known as an asphalt mix.

In such mixes, the asphalt is generally the most expensive material and continuing efforts are made to decrease the quantity of asphalt required in such mixes without decreasing the stability properties of the mix. It is also desirable for the purposes of minimizing energy costs to lower the temperature at which the asphalt mix is laid.

This invention is directed to those objectives.

STATEMENT OF THE INVENTION

According to this invention, there is provided a material consisting of the reaction product of an asphalt, a polymerizable vinyl monomer and an acrylamide.

Also, according to this invention, there is provided a method of increasing the adherence between an asphalt and an aggregate which comprises incorporating into the asphalt a vinyl monomer and an acrylamide.

DESCRIPTION OF THE INVENTION

This invention is employable with any suitable asphalt useful in producing asphalt mixes, that is, mixes comprising asphalt and aggregate. Such asphalts include natural asphalts, petroleum asphalts anad petroleum tars. The natural asphalts include, for example, asphaltite, such as Gilsonite, grahamite, glancepitch, lake asphalt, and rock asphalts. The petroleum asphalts include asphalts derived from petroleum regardless of how processed or derived. Preferably, the asphalt which will be employed are asphalts, for example, suitable for the preparation of AC-5, AC-10 and AC-20 grade asphalts. Such asphalts typically have penetrations ranging between about 20 to about 200.

As the polymerizable vinyl monomer, any suitable monomer can be employed which monomer has the general formula

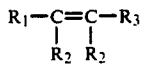

wherein $R_1$ is an aromatic group containing 6 to 12 carbon atoms including a phenyl group, a substituted phenyl group wherein the substituent is any one of an amino group, a cyano group, a halogen group, a $C_1$ to $C_3$ alkoxy group, a $C_1$ to $C_3$ alkyl group, a hydroxy group, a nitro group and the like; $R_2$ is preferably hydrogen or lower alkyl group, for example, a $C_1$ to $C_5$ alkyl; and $R_3$ is hydrogen, a lower alkyl or a group selected from the group consisting of

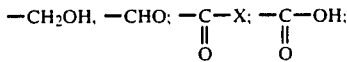

and $CH_2$—CN.

wherein X is a halogen and preferably chlorine or bromine.

Also, a polyfunctional vinyl aromatic monomer containing 6 to 12 carbon atoms in the aromatic ring and two or more polymerizable vinyl groups chemically bonded to the aromatic ring can optionally be employed. Preferred polyfunctional monomers are those having the general formula

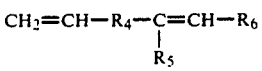

wherein $R_4$ is a divalent aromatic group containing 6 to 12 carbon atoms, and preferably a phenylene group; and $R_5$ and $R_6$ have the same meaning as described above with respect to $R_2$ and $R_3$, respectively for the monofunctional vinyl aromatic monomer. Illustrative of a suitable polyfunctional vinyl aromatic monomer is divinyl benzene. When use is made of a polyfunctional vinyl aromatic monomer in combination with a monofunctional vinyl aromatic monomer such as styrene, generally the monofunctional vinyl aromatic is present in a weight ratio of about 1:1 to 40:1 based on the weight of the polyfunctional vinyl aromatic monomer.

Of the foregoing, styrene is preferred.

The acrylamides employed in the present invention are unpolymerized and have a double bond. Desirably, they may be secondary amides or tertiary amides. Preferably, the acrylamide will be a compound of the formula

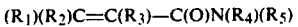

wherein $R_1$, $R_2$ and $R_3$ are independently selected from hydrogen or an alkyl containing 1 to 3 carbon atoms; $R_4$ and $R_5$ are independently selected from hydrogen, an alkyl containing 1 to 3 carbon atoms, or preferably a radical of the formula

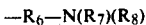

wherein $R_7$ and $R_8$ are independently selected from hydrogen or an alkyl having 1 to 3 carbon atoms, and $R_6$ is an alkylene group containing 1 to 5 carbon atoms. The preferred acrylamide is dimethylaminopropylmethacrylamide, that is, a compound of the formula

The double bond in the acrylamides provides for the ability to chemically incorporate the acrylamide into the composition. Additionally, the amino groups present in the acrylamides provide for highly desirable polarity which serves to greatly enhance the adhesive bonding of the present compositions to various substrates, including, for example, aggregates commonly employed in road repair and maintenance, as well as cementitious and other substrates. Representative acrylamides include
N,N-dimethylaminoproplymethacrylamide,
N,N-dimethylaminoisopropylmethacrylamide, N,N-dimethylaminoethylmethacrylamide,
N-methylaminopropylmethacrylamide,
N-methylaminoisopropylmethacrylamide,
N-methylaminoethylmethacrylamide, aminopropylmethacrylamide, aminoisopropylmethacrylamide, aminoethylmethacrylamide,
N,N-diethylaminopropylmethacrylamide,
N,N-diethylaminoisopropylmethacrylamide,
N,N-diethlaminoethylmethacrylamide,
N-ethylaminopropylmethacrylamide,
N-ethylaminoisopropylmethacrylamide,
N-ethylaminoethylmethacrylamide,
N-ethyl,N-methylaminopropylmethacrylamide,
N-ethyl,N-methylaminoisopropylmethacrylamide,
N-ethyl,N-methylaminoethylmethacrylamide,
N,N-dimethylaminopropylacrylamide,
N,N-dimethylaminoisopropylacrylamide,
N,N-dimethylaminoethylacrylamide,
N-methylaminopropylacrylamide,
N-methylaminoisopropylacrylamide,
N-methylaminoethylacrylamide, aminopropylacrylamide, aminoisopropylacrylamide, aminoethylacrylamide,
N,N-diethylaminopropylacrylamide,
N,N-diethylaminoisopropylacrylamide,
N,N-diethylaminoethylacrylamide,
N-ethylaminopropylacrylamide,
N-ethylaminoisopropylacrylamide,
N-ethylaminoethylacrylamide,
N-ethyl,N-methylaminopropylacrylamide,
N-ethyl,N-methylaminoisopropylacrylamide,
N-ethyl,N-methylaminoethylacrylamide.

Any suitable combination of asphalt, monomer and acrylamide can be employed. The monomer and acrylamide will preferably be incorporated into an asphalt to form a chemically-modified asphalt. This chemically-modified asphalt will then be incorporated into the principal portion of the asphalt and an amount within the range of from about 1 to about 10 weight percent of the total weight of the asphalts, preferably about three percent.

Generally, the chemically-modified asphalt will be comprised, in weight percent, of 85 to about 94.5 percent asphalt, of about 0.5 to about 10 percent of the acrylamide and from about 3 to about 10 percent of the monomer.

In the preferred embodiment, the chemically-modified asphalt will be comprised, in weight percent, of about 83 percent asphalt, 6 percent acrylamide and 13 percent of the monomer.

This chemically-modified asphalt will be blended with the principal asphalt in an amount within the range of from about 1 to about 5 weight percent, preferably in an amount of about 3 weight percent of the total weight of the asphalts.

The chemically-modified asphalt employed as the additive to conventional asphalt is an integrated material believed to be a chemical reaction product. This additive chemically-modified asphalt is prepared by heating, with agitation, a mixture consisting of asphalt, a vinyl aromatic monomer and an acrylamide at a temperature of at least about 110° C. for at least about 8 hours. Suitably, the integrated addition material is prepared by heating at about 110° C. to about 170° C. for about 8 to about 24 hours.

It will be evident from the foregoing that various modifications can be made to the method of this invention. Such, however, are within the scope of the invention.

We claim:

1. A method of increasing the bonding energy between an asphalt and an aggregate which comprises incorporating into the asphalt a chemically-modified asphalt composition obtained by heating a mixture consisting of a vinyl monomer having the general formula

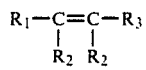

wherein $R_1$ is an aromatic group containing 6 to 12 carbon atoms, $R_2$ is hydrogen or lower alkyl group and $R_3$ is hydrogen or a lower alkyl or a group selected from the group consisting of —$CH_2OH$; —CHO;

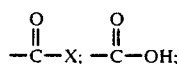

and —$CH_2$—CN wherein X is a halogen; an acrylamide and an asphalt at a temperature of at least 110° C. for at least about 8 hours, wherein said chemically modified asphalt comprises from about 1 to about 10 weight percent based on the total weight of said asphalt and said chemically-modified asphalt.

2. The method of claim 1 in which either of said asphalts is selected from the group consisting of natural asphalts, petroleum asphalt and petroleum tars.

3. The method of claim 1 in which said vinyl monomer is styrene.

4. The method of claim 1 in which said acrylamide is a compound of the formula

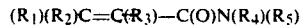

wherein $R_1$, $R_2$ and $R_3$ are independently selected from hydrogen or an alkyl containing 1 to 3 carbon atoms; $R_4$ and $R_5$ are independently selected from hydrogen, an alkyl containing 1 to 3 carbon atoms, or a radical of the formula

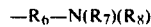

wherein $R_7$ and $R_8$ are independently selected from hydrogen or an alkyl having 1 to 3 carbon atoms, and $R_6$ is an alkylene group containing 1 to 5 carbon atoms.

5. The method of claim 1 in which said acrylamide is N,N-dimethylaminopropylmethacrylamide.

6. The method of claim 1 wherein said mixture consists of about 3 to about 10 percent by weight of said vinyl monomer, about 0.5 to about 10 percent of said acrylamide and about 85 to about 94.5 percent asphalt.

7. The method of claim 1 in which a chemically-modified asphalt consisting of asphalt, styrene and a methacrylamide is produced and is blended with a principal quantity of said other asphalt to produce a final asphalt which is mixed with said aggregate.

8. A composition obtained by heating a mixture consisting of an asphalt, a vinyl monomer and an acrylamide at a temperature of at least about 110° C. for at least about 8 hours.

* * * * *